United States Patent
Shimomura (10) Patent No.: US 10,953,323 B2
(45) Date of Patent: Mar. 23, 2021

(54) RADIO COMMUNICATION TERMINAL, METHOD FOR CONTROLLING THE SAME, AND INFORMATION STORAGE MEDIUM

(75) Inventor: Tomonori Shimomura, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 126 days.

(21) Appl. No.: 13/128,930

(22) PCT Filed: Aug. 25, 2009

(86) PCT No.: PCT/JP2009/064761
§ 371 (c)(1),
(2), (4) Date: Jul. 5, 2011

(87) PCT Pub. No.: WO2010/055720
PCT Pub. Date: May 20, 2010

(65) Prior Publication Data
US 2011/0256829 A1    Oct. 20, 2011

(30) Foreign Application Priority Data
Nov. 17, 2008 (JP) .............................. JP2008-293046

(51) Int. Cl.
*A63F 13/327* (2014.01)
*A63F 13/92* (2014.01)
(Continued)

(52) U.S. Cl.
CPC ............ *A63F 13/327* (2014.09); *A63F 13/34* (2014.09); *A63F 13/92* (2014.09); *A63F 13/803* (2014.09); *A63F 13/822* (2014.09)

(58) Field of Classification Search
CPC .......... A63F 2300/204; A63F 2300/405; A63F 13/327; A63F 13/34; A63F 13/92; A63F 13/822; A63F 13/803
(Continued)

(56) References Cited

U.S. PATENT DOCUMENTS 7,340,503 B2 *  3/2008  Washburn ..................... 709/206
7,491,124 B2 *  2/2009  Tanaka et al. .................. 463/42
(Continued)

FOREIGN PATENT DOCUMENTS

CN       101114901 A     1/2008
EP         1493474 A2     1/2005
(Continued)

OTHER PUBLICATIONS

International Preliminary Report on Patentability and Written Opinion for corresponding application PCT/JP2009/064761, dated Jun. 30, 2011.
(Continued)

*Primary Examiner* — Steven S Kelley
(74) *Attorney, Agent, or Firm* — Matthew B. Dernier, Esq.

(57) ABSTRACT

Provided is a wireless communication terminal capable of efficiently exchanging, with another wireless communication terminal, data items generated by a plurality of application programs. The wireless communication terminal, which performs wireless communication with another wireless communication terminal, is configured to: store a plurality of exchange data-related information items output when a plurality of application programs are executed; determine, when a wireless communication connection is established to the other wireless communication terminal, an exchange data-related information item to be subjected to data exchange processing, based on the stored plurality of exchange data-related information items and exchange data-related information items stored in the other wireless communication terminal; and execute the data exchange processing which is based on the determined exchange data-related information item, with the other wireless communication terminal.

18 Claims, 4 Drawing Sheets (51) Int. Cl.
*A63F 13/34* (2014.01)
*A63F 13/803* (2014.01)
*A63F 13/822* (2014.01)

(58) Field of Classification Search
USPC ........ 455/41.2, 39, 555, 41.1; 463/42, 9, 40, 463/41; 273/254, 459
See application file for complete search history.

(56) References Cited

U.S. PATENT DOCUMENTS

| | | | |
|---|---|---|---|
| 7,566,274 B2* | 7/2009 | Johnson et al. ................ | 463/42 |
| 7,840,182 B2 | 11/2010 | Takehara | |
| 7,967,671 B2* | 6/2011 | Kouno ................... | A63F 13/10 |
| | | | 463/12 |
| 8,077,157 B2* | 12/2011 | Sengupta et al. ............ | 345/173 |
| 8,442,482 B2* | 5/2013 | Maier .................. | H04W 64/00 |
| | | | 455/404.1 |
| 2001/0053691 A1* | 12/2001 | Harma ................... | A63F 13/12 |
| | | | 455/419 |
| 2002/0049086 A1* | 4/2002 | Otsu ...................... | A63F 13/35 |
| | | | 463/42 |
| 2002/0098885 A1* | 7/2002 | Sakaguchi ............ | A63F 13/335 |
| | | | 463/31 |
| 2003/0167286 A1 | 9/2003 | Yasuda | |
| 2003/0181242 A1* | 9/2003 | Lee ........................ | A63F 13/12 |
| | | | 463/42 |
| 2004/0259642 A1 | 12/2004 | Kuwahara | |
| 2005/0070359 A1* | 3/2005 | Rodriquez ............ | A63F 13/795 |
| | | | 463/42 |
| 2005/0108427 A1 | 5/2005 | Datta | |
| 2005/0137014 A1* | 6/2005 | Vetelainen ............ | A63F 13/795 |
| | | | 463/42 |
| 2005/0250487 A1 | 11/2005 | Miwa et al. | |
| 2006/0034315 A1 | 2/2006 | Maekawa et al. | |
| 2006/0067290 A1 | 3/2006 | Miwa et al. | |
| 2006/0068702 A1 | 3/2006 | Miwa et al. | |
| 2006/0111186 A1 | 5/2006 | Hattori | |
| 2007/0041426 A1* | 2/2007 | Hashimoto .......... | H04B 1/7163 |
| | | | 375/130 |
| 2007/0121541 A1 | 5/2007 | Matsuo | |
| 2007/0123168 A1 | 5/2007 | Takehara | |
| 2007/0218997 A1* | 9/2007 | Cho ...................... | A63F 13/795 |
| | | | 463/42 |
| 2007/0265096 A1* | 11/2007 | Kouno ................... | A63F 13/10 |
| | | | 463/42 |
| 2007/0266178 A1* | 11/2007 | Wong ...................... | H04L 49/90 |
| | | | 709/246 |
| 2008/0119281 A1* | 5/2008 | Hirose .................... | A63F 13/12 |
| | | | 463/42 |
| 2008/0132331 A1* | 6/2008 | Gatto .................... | G07F 17/32 |
| | | | 463/31 |
| 2009/0061776 A1 | 3/2009 | Takei et al. | |
| 2013/0196771 A1 | 8/2013 | Tanaka | |
| 2013/0203507 A1 | 8/2013 | Tanaka | |

FOREIGN PATENT DOCUMENTS

| | | |
|---|---|---|
| EP | 1901528 A1 | 3/2008 |
| JP | 11096051 A | 4/1999 |
| JP | 2001157269 A | 6/2001 |
| JP | 2002175234 A | 6/2002 |
| JP | 2003256258 A | 9/2003 |
| JP | 2005028103 A | 2/2005 |
| JP | 2005-269227 A | 9/2005 |
| JP | 2006-003401 A | 1/2006 |
| JP | 2006051251 A | 2/2006 |
| JP | 2007-142613 A | 6/2007 |
| JP | 2007-158478 A | 6/2007 |
| JP | 2007249730 A | 9/2007 |
| JP | 2008-003981 A | 1/2008 |
| JP | 2008012071 A | 1/2008 |
| WO | 2006082861 A1 | 8/2006 |

OTHER PUBLICATIONS

International Search Report for corresponding application PCT/JP2009/064761, dated Nov. 24, 2009.
Office Action for corresponding Japanese Patent Application No. 2010-537727, dated Apr. 2, 2013.
Office Action for corresponding Japanese Patent Application No. 2010-537727, dated Oct. 15, 2013.
Mail de Cute, Dengeki Nintendon64, MediaWorks, vol. 6, No. 4, 5 Pages, Apr. 1, 2001. (For relevancy, see Office Action of corresponding JP application 2010-537727, dated Oct. 15, 2013 cited above).
Office Action for corresponding Chinese Patent Application No. 200980145612.7, dated Nov. 25, 2013.
Office Action for corresponding Chinese Patent Application No. 200980145612.7, dated Apr. 27, 2013.
Office Action for corresponding JP Patent Application No. 2014-020481, dated Dec. 2, 2014.
European Search Report for corresponding EP Patent Application No. 098259731-1854, 9 pages, dated Jan. 27, 2016.
Alf Inge Wang, "Issues related to Development of Wireless Peer-to-Peer Games in J2ME" Proceedings of the Advanced International Conference on Telecommunications and International Conference on Internet and Web Applications and Services, 6 pages, Feb. 19, 2006.
European Office Action for corresponding EP Patent Application No. 09825973.2-1854, 9 pages, dated Feb. 6, 2017.
Office Action for corresponding JP Patent Application No. 2014-020481, dated Jul. 7, 2015.

* cited by examiner

| APPLICATION PROGRAM | EXCHANGE DATA CONTROL INFORMATION | EXCHANGE TARGET DATA |
|---|---|---|
| RACING GAME A | SCRIPT A | REPLAY DATA 1 |
| ROLE-PLAYING GAME B | SCRIPT B | CHARACTER DATA 2 |
| ⋮ | ⋮ | ⋮ |

RADIO COMMUNICATION TERMINAL, METHOD FOR CONTROLLING THE SAME, AND INFORMATION STORAGE MEDIUM

TECHNICAL FIELD

The present invention relates to a wireless communication terminal capable of executing wireless communication with another wireless communication terminal, and also relates to a method of controlling the wireless communication terminal, and an information storage medium.

BACKGROUND ART

The downsizing of wireless communication modules and such other factors have led to the advent of wireless communication terminals that can be carried outside with no trouble, such as smartphones and portable game machines. Such wireless communication terminals are capable of transmitting/receiving data to/from other wireless communication terminals without being connected by cables. Accordingly, for example, for the portable game machine or the like, there is proposed a technology of, while an application program of a game is being executed, exchanging data on the application program (for example, replay data, item data, character data, etc. of the game) with another portable game machine (for example, Patent Literature 1 to Patent Literature 4).

PRIOR ART DOCUMENT

Patent Document

Patent Document 1: US 2006/0034315 A1
Patent Document 2: US 2005/0250487 A1
Patent Document 3: US 2006/0068702 A1
Patent Document 4: US 2006/0067290 A1

SUMMARY OF THE INVENTION

For the wireless communication terminal described above, in the case of executing exchange of data with another wireless communication terminal, an application program for processing the data needs to be kept under execution while a wireless communication connection is established to the other wireless communication terminal and the data is exchanged. For this reason, in order for data items generated by a plurality of application programs to be exchanged collectively in a state in which a connection is established to the other wireless communication terminal, it is necessary to execute the plurality of application programs simultaneously. However, in some cases, such simultaneous execution of a plurality of applications is difficult to achieve due to, for example, constraints of hardware resources. To avoid this, if the data items are exchanged by executing the application programs one by one, it takes time to execute data exchange processing. Particularly, there may occur a case where data cannot be efficiently exchanged in such a communication environment that the established communication connection is difficult to maintain for a long period of time, as typified by a case where the data exchange is performed with another wireless communication terminal which happens to be present nearby on the road or the like (case of so-called passing-by connection).

The present invention has been made in view of the above-mentioned circumstances, and an object thereof is to provide a wireless communication terminal capable of efficiently exchanging, with another wireless communication terminal, data items generated by a plurality of application programs, and also to provide a method of controlling the wireless communication terminal, and an information storage medium.

A wireless communication terminal according to the present invention, which performs wireless communication with another wireless communication terminal, includes: storage means for storing a plurality of exchange data-related information items output when a plurality of application programs are executed; exchange data determining means for determining, when a wireless communication connection is established to the other wireless communication terminal, an exchange data-related information item to be subjected to data exchange processing, based on the plurality of exchange data-related information items stored in the storage means and exchange data-related information items stored in the other wireless communication terminal; and data exchanging means for executing the data exchange processing which is based on the determined exchange data-related information item, with the other wireless communication terminal.

Further, in the wireless communication terminal, in a case where a plurality of exchange data-related information items are determined to be subjected to data exchange processing, the exchange data determining means may determine execution order of the data exchange processing which is based on each of the plurality of the determined exchange data-related information items, based on attribute information associated with each of the plurality of the determined exchange data-related information items, and the data exchanging means may execute the data exchange processing which is based on each of the plurality of the determined exchange data-related information items, in accordance with the determined execution order.

Further, in the wireless communication terminal, the attribute information may contain information on an execution history of the application program corresponding to the exchange data-related information item.

Further, in the wireless communication terminal, the attribute information may contain information on the data exchange processing executed in a past based on the exchange data-related information item.

Further, in the wireless communication terminal, the attribute information may contain information on an update history of the exchange data-related information item.

Further, in the wireless communication terminal, in a case where there are a plurality of other wireless communication terminals for which the wireless communication connection can be established, the exchange data determining means may determine order in which the data exchange processing is executed for each of the plurality of other wireless communication terminals, and may establish the wireless communication connection to each of the plurality of other wireless communication terminals in the determined order.

Further, in the wireless communication terminal, the exchange data-related information item may contain exchange data control information defining a communication procedure used when the data exchange processing is executed with the other wireless communication terminal, and the data exchanging means may execute the data exchange processing which is based on the exchange data-related information item in accordance with the exchange data control information.

Further, a method of controlling a wireless communication terminal, which performs wireless communication with another wireless communication terminal, according to the present invention includes the steps of: storing, in storage means, a plurality of exchange data-related information items output when a plurality of application programs are executed; determining, when a wireless communication connection is established to the other wireless communication terminal, an exchange data-related information item to be subjected to data exchange processing, based on the plurality of exchange data-related information items stored in the storage means and exchange data-related information items stored in the other wireless communication terminal; and executing the data exchange processing which is based on the determined exchange data-related information item, with the other wireless communication terminal.

Further, an information storage medium according to the present invention is a computer-readable information storage medium having a program stored therein, the program causing a wireless communication terminal which performs wireless communication with another wireless communication terminal to function as: means for storing, in storage means, a plurality of exchange data-related information items output when a plurality of application programs are executed; exchange data determining means for determining, when a wireless communication connection is established to the other wireless communication terminal, an exchange data-related information item to be subjected to data exchange processing, based on the plurality of exchange data-related information items stored in the storage means and exchange data-related information items stored in the other wireless communication terminal; and data exchanging means for executing the data exchange processing which is based on the determined exchange data-related information item, with the other wireless communication terminal.

DETAILED DESCRIPTION OF THE PREFERRED EMBODIMENTS

Hereinbelow, an embodiment of the present invention is described in detail with reference to the drawings.

Figure 1:
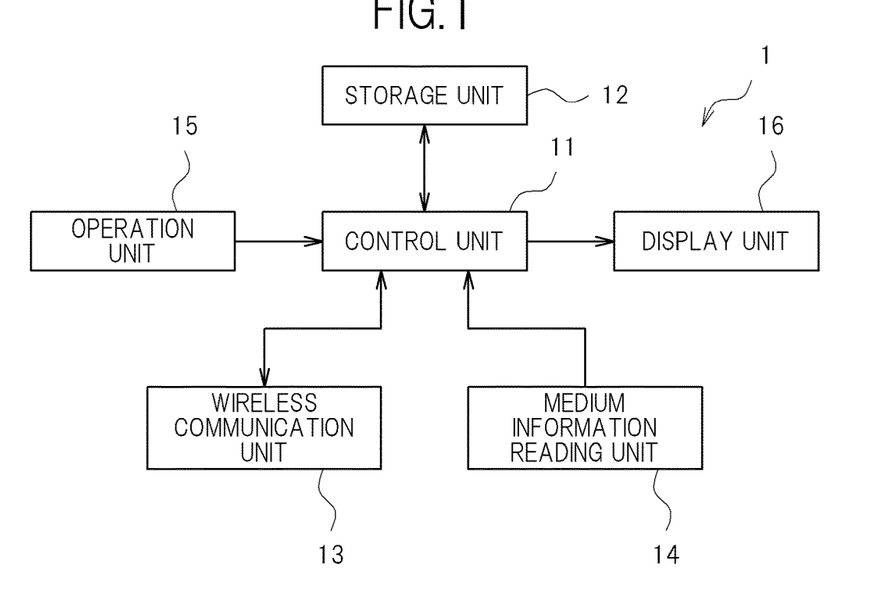
FIG. 1 A block diagram illustrating a configuration example of a wireless communication terminal according to an embodiment of the present invention.

FIG. 1 is a block diagram illustrating a configuration example of a wireless communication terminal 1 according to the embodiment of the present invention. As illustrated in the figure, the wireless communication terminal 1 is a portable information processing apparatus, such as a smartphone or a portable game machine, and includes a control unit 11, a storage unit 12, a wireless communication unit 13, a medium information reading unit 14, an operation unit 15, and a display unit 16.

The control unit 11 is, for example, a microprocessor, and executes various kinds of information processing in accordance with a program stored in the storage unit 12. A specific example of the processing executed by the control unit 11 in this embodiment is described later.

The storage unit 12 includes a memory device such as a RAM or a ROM, and stores the program executed by the control unit 11 and various kinds of data. Further, the storage unit 12 operates as a working memory for the control unit 11.

The wireless communication unit 13 is a wireless communication interface, and transmits/receives information to/from other wireless communication terminals through wireless communication without using a transmission line. For example, the wireless communication unit 13 may be a wireless communication module capable of executing wireless communication (WLAN communication) in accordance with the IEEE 802.11 standard.

The medium information reading unit 14 reads information stored in a computer-readable information storage medium, such as an optical disc or a memory card. The information thus read is temporarily stored in the storage unit 12, and is used for processing executed by the control unit 11.

The operation unit 15 includes an input device such as a button, and outputs the content of an instruction operation performed by a user to the control unit 11. Further, the display unit 16 includes, for example, a liquid crystal panel, and, based on an instruction from the control unit 11, displays various kinds of information to be presented to the user on a display screen.

Figure 2:
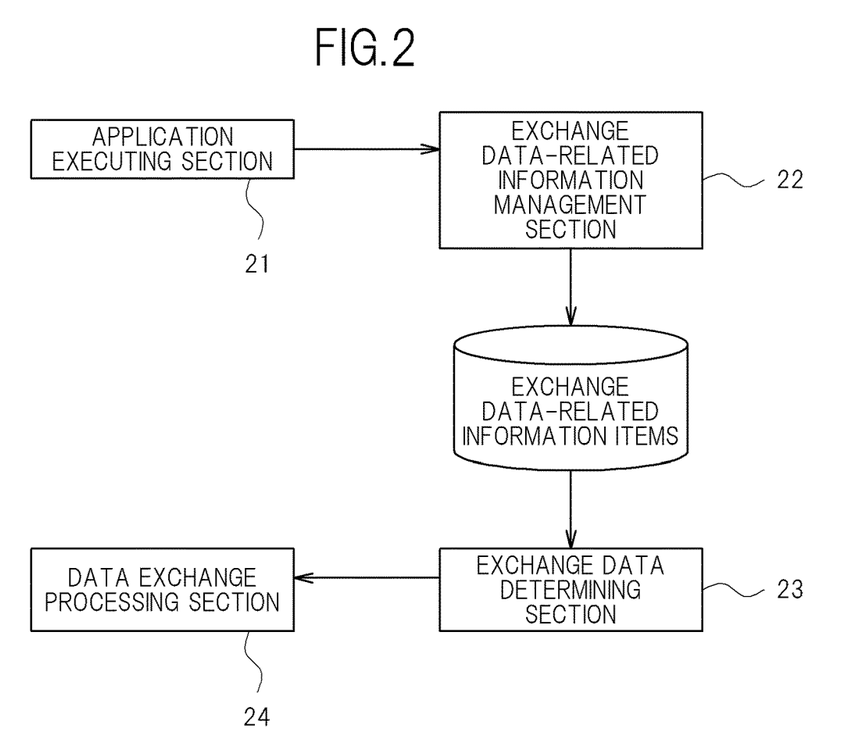
FIG. 2 A functional block diagram illustrating a function example of the wireless communication terminal according to the embodiment of the present invention.

Hereinbelow, description is given of functions implemented by the wireless communication terminal 1 according to this embodiment. FIG. 2 is a functional block diagram illustrating a function example of the wireless communication terminal 1. As illustrated in the figure, the wireless communication terminal 1 includes an application executing section 21, an exchange data-related information management section 22, an exchange data determining section 23, and a data exchange processing section 24. The control unit 11 executes the programs stored in the storage unit 12, and controls the wireless communication unit 13, thereby implementing those functions. Note that, the application executing section 21 is implemented by the control unit 11 executing an application program read from such an information storage medium as an optical disc by the medium information reading unit 14 and stored in the storage unit 12. On the other hand, the other functions are implemented by the control unit 11 executing a system software program stored in advance in, for example, a ROM. The system software program is an independent program from the above-mentioned application program, and may be provided, like the application program, by being stored in various kinds of information storage media or may be provided through a communication network such as the Internet.

The application executing section 21 executes the application program such as a game application. Particularly, in this embodiment, the application executing section 21 executes a plurality of kinds of application programs compliant with data exchange processing. Then, in a case where such an application program is executed, the application executing section 21 outputs exchange data-related information item corresponding to the application program in accordance with the instruction operation performed by the user with respect to the operation unit 15 or the progress of the processing of the application program.

The exchange data-related information item is such information that is related to data to be exchanged with another wireless communication terminal 1 in relation to the application program, and may contain exchange target data itself, which is to be exchanged with the other wireless communication terminal 1. The exchange data-related information management section 22 receives the exchange data-related information item output by the application executing section 21, and then stores the exchange data-related information item in the storage unit 12. With this, the storage unit 12 stores a plurality of exchange data-related information items each associated with any one of the plurality of application programs.

Figure 3:
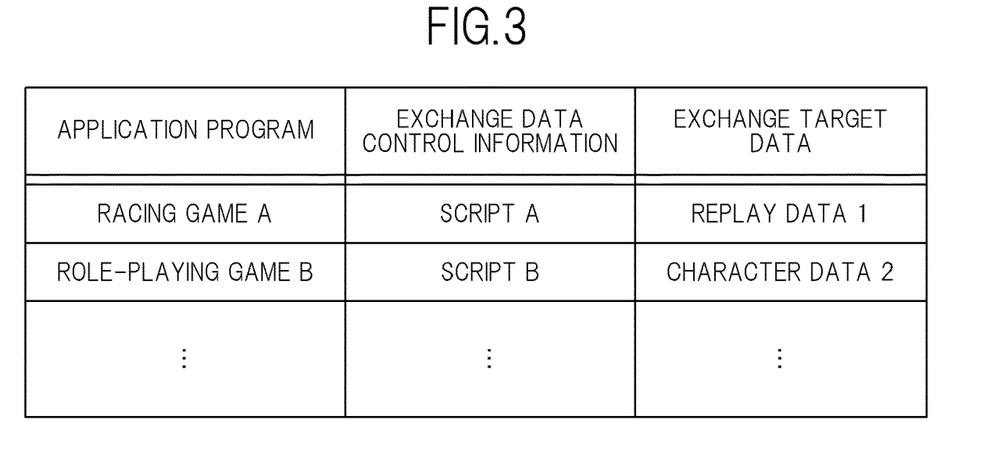
FIG. 3 A diagram illustrating an example of exchange data-related information items stored in the wireless communication terminal according to the embodiment of the present invention.

FIG. 3 is a diagram illustrating an example of the exchange data-related information items stored in the storage unit 12. As illustrated in the figure, each of the plurality of exchange data-related information items contains information for identifying the corresponding application program, exchange data control information, and the exchange target data. For example, in a case where the application program is a game application, the exchange target data is replay data, item data, character data, or the like. Note that, in a case where, with regard to a given application program, the wireless communication terminal 1 only acquires data from another wireless communication terminal 1 and does not provide data to the other wireless communication terminal 1, the exchange data-related information item associated with the given application program does not need to contain the exchange target data. Further, a plurality of exchange data-related information items may be stored in association with one application program in accordance with, for example, the instruction operation by the user.

The exchange data control information is information defining a communication procedure used at the time of executing the data exchange processing with another wireless communication terminal 1, and is, for example, a communication script written in a script language executable by the system software of the wireless communication terminal 1. Specifically, the exchange data control information may be such script information that describes: a condition for providing the corresponding exchange target data to another wireless communication terminal 1; a condition for acquiring the exchange target data from another wireless communication terminal 1; or a procedure for, in a case where a plurality of kinds of exchange target data items exist in one exchange data-related information item, identifying data to be actually subjected to data exchange from among the plurality of kinds of data items. Note that, instead of the script information, the exchange data control information may be a program module executable by the control unit 11.

Note that, in accordance with an instruction from the user, the exchange data-related information management section 22 may be allowed to delete the exchange data-related information item stored in the storage unit 12 or to execute temporary invalidation of the exchange data-related information item.

In a state in which the exchange data-related information items are stored in the storage unit 12, the wireless communication terminal 1 executes, in accordance with an instruction from the user, the starting of and the interruption of an operation in a data exchange mode. During the operation in the data exchange mode, the wireless communication terminal 1 may execute any one of the plurality of application programs described above in parallel or may execute an application program other than those application programs. Note that, depending on the processing content of the application program under execution, the application executing section 21 may temporarily stop the operation in the data exchange mode. During the operation in the data exchange mode, if another wireless communication terminal 1 operating in the data exchange mode in the same manner approaches within a wirelessly-communicable distance range, the wireless communication unit 13 detects the presence of the other wireless communication terminal 1, and then attempts to establish a wireless communication connection. Here, establishing a wireless communication connection refers to exchanging information for identifying each other's communication partner (for example, MAC address) and establishing a state in which the wireless communication terminals 1 are capable of one-to-one transmission/reception of data with each other.

As a specific example, it is assumed that the application executing section 21 executes the application program of a racing game A to output the exchange data-related information item containing the replay data therefor as the exchange target data, and further executes a role-playing game B to output the exchange data-related information item containing the character data therefor as the exchange target data.

Note that, the wireless communication terminal 1 can operate in the data exchange mode even when the application executing section 21 is executing any one of the application programs of the racing game A and the role-playing game B, or even when the application executing section 21 is executing another application program such as a video player. Further, the wireless communication terminal 1 can operate in the data exchange mode even when the wireless communication terminal 1 has entered into a suspended state in response to, for example, an instruction from the user while such an application program as the racing game A, the role-playing game B, or the video player is being executed. In the suspended state, power supply to the control unit 11 or the like is cut off, but power is supplied to the wireless communication unit 13, which thus continues to output a control signal for detecting another wireless communication terminal 1. Then, if the presence of another wireless communication terminal 1 is detected, a control signal for resuming the power supply to the control unit 11 is output, and the data exchange processing described later is then started.

During the operation in the data exchange mode, if a wireless communication connection is established to another wireless communication terminal 1, the exchange data determining section 23 acquires a list of the exchange data-related information items stored in the other wireless communication terminal 1. Then, based on the exchange data-related information items stored in the other wireless communication terminal 1 and the plurality of exchange data-related information items stored in its own storage unit 12, the exchange data determining section 23 determines, from among the plurality of exchange data-related information items, the exchange data-related information item which is actually to be subjected to the data exchange processing. Further, in a case where there are a plurality of exchange data-related information items determined to be subjected to the data exchange processing, the exchange data determining section 23 may determine execution order of the data exchange processing based on those exchange data-related information items.

Specifically, for example, the exchange data determining section 23 selects, as the information to be subjected to the data exchange processing with the partner wireless communication terminal 1, the exchange data-related information items associated with a common application program between its own wireless communication terminal 1 and the partner wireless communication terminal 1. Note that, a specific example of the method of determining the order of execution of the data exchange processing is described later. Further, in a case where it is possible to establish a wireless communication connection to a plurality of wireless communication terminals 1, the exchange data determining section 23 may determine in which order the data exchange processing is to be executed with the wireless communication terminals 1, to thereby execute the data exchange processing with the wireless communication terminals 1 in the determined order. A specific example of the method of determining the order of the wireless communication terminals 1 for which the data exchange processing is to be executed is also described later.

The data exchange processing section 24 executes, in the order determined by the exchange data determining section 23, the data exchange processing which is based on the exchange data-related information item determined by the exchange data determining section 23, with another wireless communication terminal 1 to which the wireless communication connection is established.

Specifically, in accordance with the above-mentioned communication procedure defined by the exchange data control information, the data exchange processing section 24 executes the transmission of the exchange target data to another wireless communication terminal 1 and/or the reception of the exchange target data from the other wireless communication terminal 1. Accordingly, even when the application program itself, which has output the exchange data-related information item to be subjected to the data exchange processing, is not being executed, it is possible to realize the exchange of data related to the application program owing to the communication procedure defined in advance by the application program.

In addition, as described above, if the exchange data control information is set to be the script information, and the data exchange processing section 24 is configured to interpret and execute the script, it is possible to reduce the risk of, for example, compromising security or suffering from unstable operation due to the occurrence of an error, which is caused by the specific implementation of a application program. In this case, the data exchange processing section 24 may contain a module of a native function which can be called from the communication script.

Figure 4:
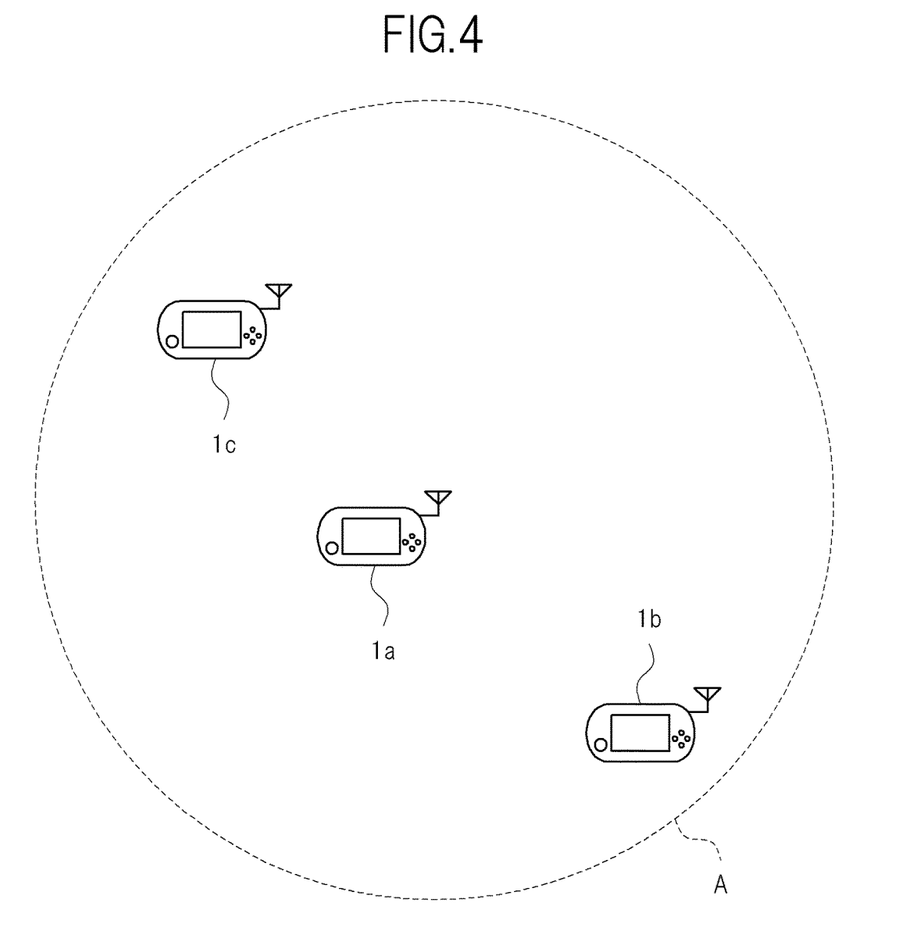
FIG. 4 A conceptual diagram of a wireless communication network to which the wireless communication terminals according to the embodiment of the present invention are to be connected.

FIG. 4 is a conceptual diagram illustrating a state of a wireless communication network to which the wireless communication terminals 1 according to this embodiment are to be connected. In the example of the figure, in a wirelessly-communicable distance range A of a wireless communication terminal 1a, other wireless communication terminals 1b and 1c exist. Hereinbelow, with reference to a flow chart of FIG. 5, detailed description is given of an example of processing performed when, in such a state, the wireless communication terminal 1a performs the data exchange processing through wireless communication with the other wireless communication terminal 1b or 1c. Skilled artisans will recognize that the illustrated processing of FIGS. 4-5 (described herein) clearly encompasses an automated process in which the system automatically instructs the execution of a data exchange with one or more of the wireless communication terminals 1b or 1c that are determined to be within the predetermined range A.

Figure 5:
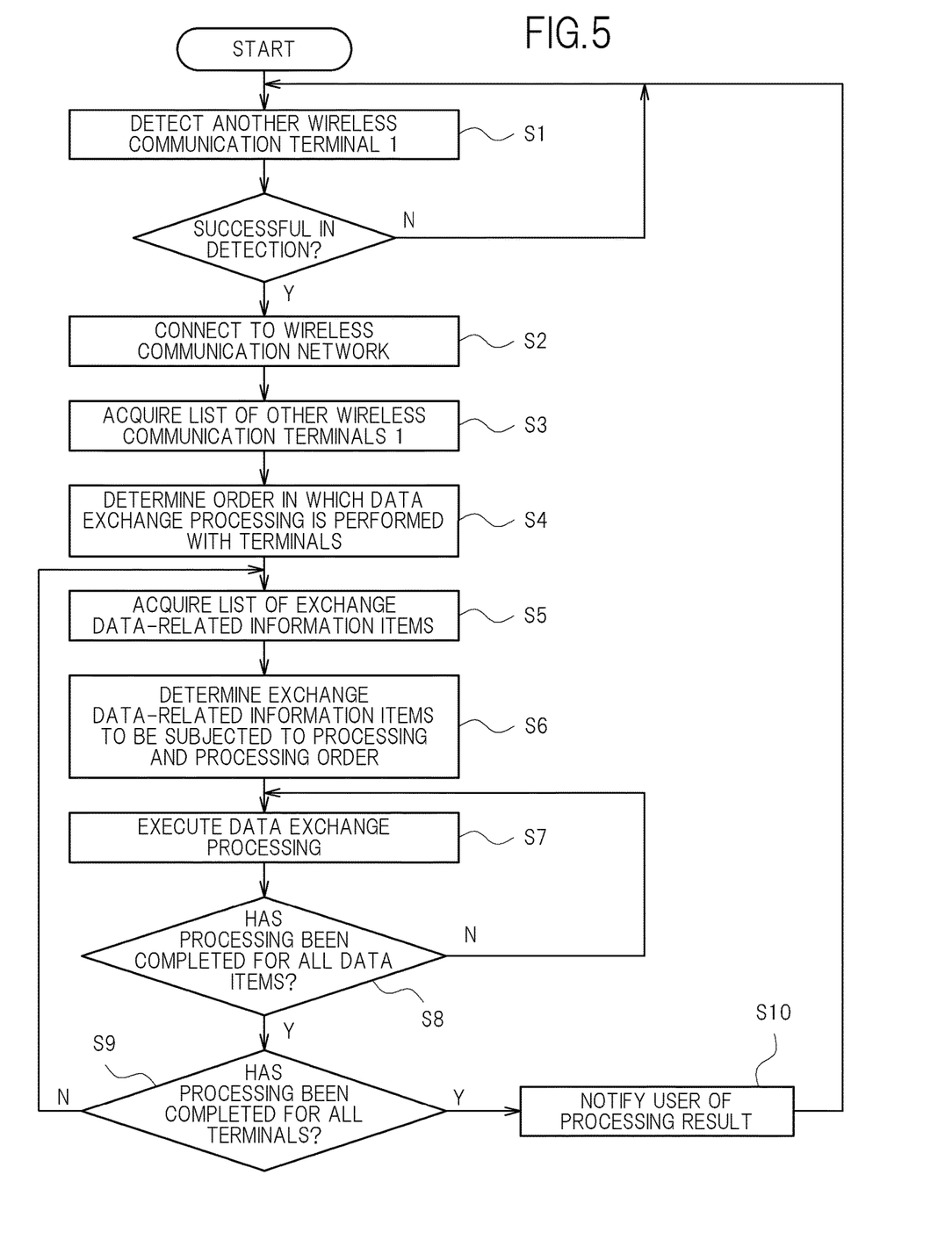
FIG. 5 A flow chart illustrating an example of a flow of processing executed by the wireless communication terminal according to the embodiment of the present invention.

First, the wireless communication terminal 1a starts the operation in the data exchange mode in response to, for example, the instruction operation performed by the user, and then attempts to detect another wireless communication terminal 1 by periodically transmitting a beacon signal (S1). If another wireless communication terminal 1 is detected by means of, for example, a response to the beacon signal, the wireless communication terminal 1a connects to the wireless communication network through a predetermined procedure (S2). On this occasion, by using an ad hoc mode to connect to the wireless communication network, the wireless communication terminal 1a can establish a communication connection to another wireless communication terminal 1 even in a case where there exists no wireless LAN access point. Note that, in the case of the wireless LAN, a logical communication network to which each terminal is connected is identified by a service set identifier (SSID). In this embodiment, in order to allow the wireless communication terminals 1 of the same model to perform the data exchange processing described below, each of the wireless communication terminals 1 joins the wireless communication network by using a common SSID determined in advance depending on the model of the wireless communication terminal 1, instead of a separate SSID set depending on the user.

After joining the wireless communication network, the wireless communication terminal 1a acquires a list of other wireless communication terminals 1 (peers) existing in the communicable distance range A (S3). In the example of FIG. 4, a list of peers indicating the wireless communication terminals 1b and 1c is acquired. The list contains, for example, the MAC address for identifying each of the wireless communication terminals 1 and information for identifying the user of each of the wireless communication terminals 1.

Subsequently, the wireless communication terminal 1a determines the order in which the data exchange processing is performed with the plurality of wireless communication terminals 1 indicated in the list acquired in S3 (S4). In this description, as an example, it is assumed that the data exchange is determined to be performed firstly with the wireless communication terminal 1b and then with the wireless communication terminal 1c.

Subsequently, the wireless communication terminal 1a establishes a wireless communication connection to the wireless communication terminal 1 being the partner of the data exchange processing (here, wireless communication terminal 1b), and then receives the list of the exchange data-related information items stored in the partner wireless communication terminal 1b (S5). Then, based on the list of the exchange data-related information items of the wireless communication terminal 1b received in S5 and the list of the exchange data-related information items stored by itself, the wireless communication terminal 1a determines the exchange data-related information items which are to be subjected to the execution of the data exchange processing and the execution order therefor (S6).

After that, the wireless communication terminal 1a performs the data exchange processing which is based on the exchange data-related information items in the order determined in S6 (S7). Specifically, the wireless communication terminal 1a executes the data exchange processing based on the exchange data control information contained in the exchange data-related information item to be subjected to the data exchange processing. As noted above, skilled artisans will recognize that the execution (S7) illustrated in FIG. 5 (described herein) clearly encompasses an automated process in which the system automatically instructs the execution of a data exchange with one or more of the wireless communication terminals 1b or 1c that are determined to be within the predetermined range A.

After the data exchange processing which is based on one exchange data-related information item is finished, the wireless communication terminal 1a determines whether or not the processing has been executed for all exchange data-related information items for which the data exchange processing should be executed (S8). If the processing has not been completed for all the exchange data-related information items which have been determined to be subjected to the data exchange processing in S6, the wireless communication terminal 1a returns to S7, and then executes the data exchange processing which is based on the next exchange data-related information item in accordance with the order determined in S6. On the other hand, if the data exchange processing has been finished for all the exchange data-related information items, the wireless communication terminal 1a determines whether or not the data exchange processing has been executed with all the wireless communication terminals 1 indicated in the list acquired in S3 (S9). Here, because the data exchange processing has not been finished with the wireless communication terminal 1c, the processing of from S5 to S8 is executed again with the wireless communication terminal 1c set as the partner of the data exchange processing. If the data exchange processing is finished with the wireless communication terminal 1c, this means that the data exchange processing has been executed with all the wireless communication terminals 1 indicated in the list, and hence subsequent processing is then executed.

Lastly, in a case where certain data exchange processing has been executed in S7, the wireless communication terminal 1a causes the display unit 16 to display information indicating that the data exchange processing has been executed, to thereby notify the user of an execution result (S10). To give a specific example, the wireless communication terminal 1a displays, in a predetermined area of the display screen, message information indicating, for example, "passing-by connection has been performed". Alternatively, a predetermined icon image or the like may be displayed at a predetermined position of the display screen. Further, the message or the image to be presented to the user may be defined by the exchange data control information corresponding to each of the exchanged data items.

After that, the wireless communication terminal 1a returns to S1, and waits again for another wireless communication terminal 1 to approach. Note that, in the flow of FIG. 5 described above, the wireless communication terminal 1a determines the order of the communication, taking lead in the data exchange with another wireless communication terminal 1. However, depending on a connection environment or a connection timing, the wireless communication terminal 1a may accept the data exchange led by another wireless communication terminal 1. Further, in the flow described above, the data exchange is sequentially executed with the wireless communication terminals 1 in the order determined in S4 until the end. However, each time the data exchange processing is completed with one wireless communication terminal 1, the detection of the wireless communication terminal 1 may be executed again.

Further, in the state in which the notification of S10 has been executed, if the user performs the instruction operation with respect to the operation unit 15 to select notified information, the application executing section 21 of the wireless communication terminal 1a may execute the application program corresponding to the selected exchange data-related information item.

Further, if the application program subjected to the data exchange processing is being executed when the data exchange processing is executed, in addition to simply providing the notification to the user in S10, the wireless communication terminal 1a may provide, as an event, a notification indicating that the data exchange processing has been executed to the application executing section 21.

Through the data exchange processing described above, the exchange target data acquired from another wireless communication terminal 1 is stored in the storage unit 12. Then, when the application executing section 21 executes the corresponding application program, the application executing section 21 refers to a result of the data exchange processing, and reflects the result in the processing of the application program. For example, in a case where the replay data is acquired from another wireless communication terminal 1, the replay data is presented, as an option, along with the already-stored replay data of the user himself/herself of the wireless communication terminal 1, and is then reproduced in response to the selection from the user.

Here, description is given of a specific example of the processing of presenting, to the user, the result of execution of the passing-by connection described above. In a case where the user has performed the instruction operation to respond to the above-mentioned notification of S10, or in a case where, regardless of such a notification, the user has performed the instruction operation to cause an execution status of the passing-by connection to be displayed, the exchange data-related information management section 22 of the wireless communication terminal 1a may cause the display unit 16 to display a list of application programs associated with the exchange data-related information items stored in the storage unit 12. On this occasion, the exchange data-related information management section 22 displays the list on the display screen in a manner that an application program which is associated with the exchange data-related information item subjected to the data exchange processing and has not been executed yet after the execution of the data exchange processing (that is, application program for which the user has not checked the result of the data exchange processing yet) can be distinguished from the other application programs.

Figure 6:
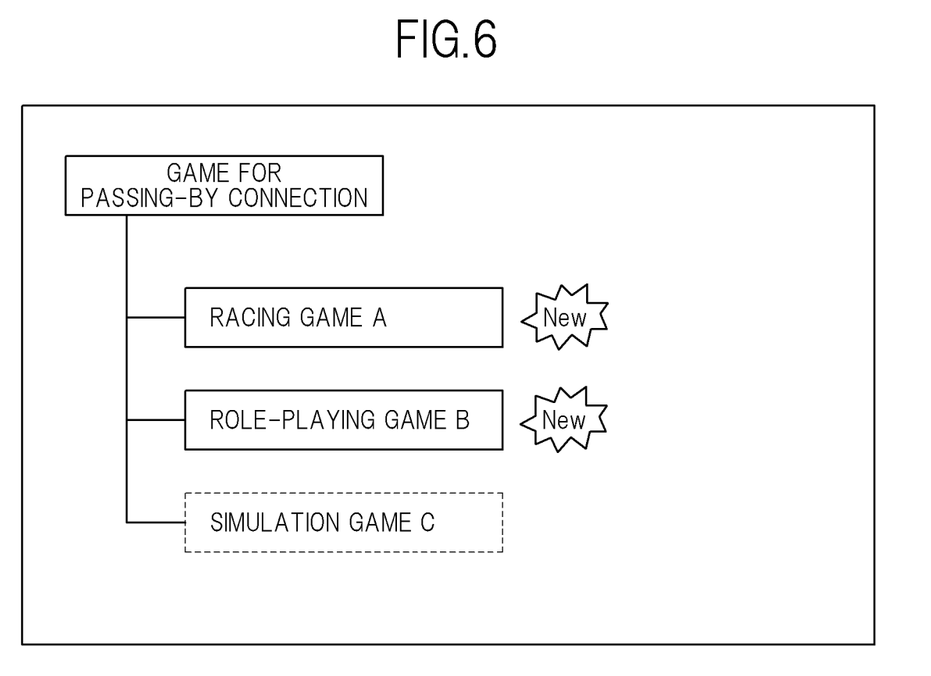
FIG. 6 A diagram illustrating an example of a list display screen for application programs to be subjected to data exchange processing.

FIG. 6 illustrates a specific example of a list display screen for application programs (specifically a list of games) compliant with the passing-by connection described above. In the example of the figure, images indicating that the data exchange processing has been performed are attached to application programs for which the data exchange processing has been executed (racing game A and role-playing game B), while an application program for which the data exchange processing has not been executed (simulation game C) is dark-displayed with a color having low lightness (in the figure, expressed by broken lines). Note that, the display method is not limited to the above-mentioned example, and, for example, intensified display may be used by highlighting the application program for which the data exchange processing has been executed. By referring to the list display screen described above, the user can easily recognize application programs registered for the passing-by connection and application programs for which the data exchange processing has been actually executed thereamong.

Figure 7:
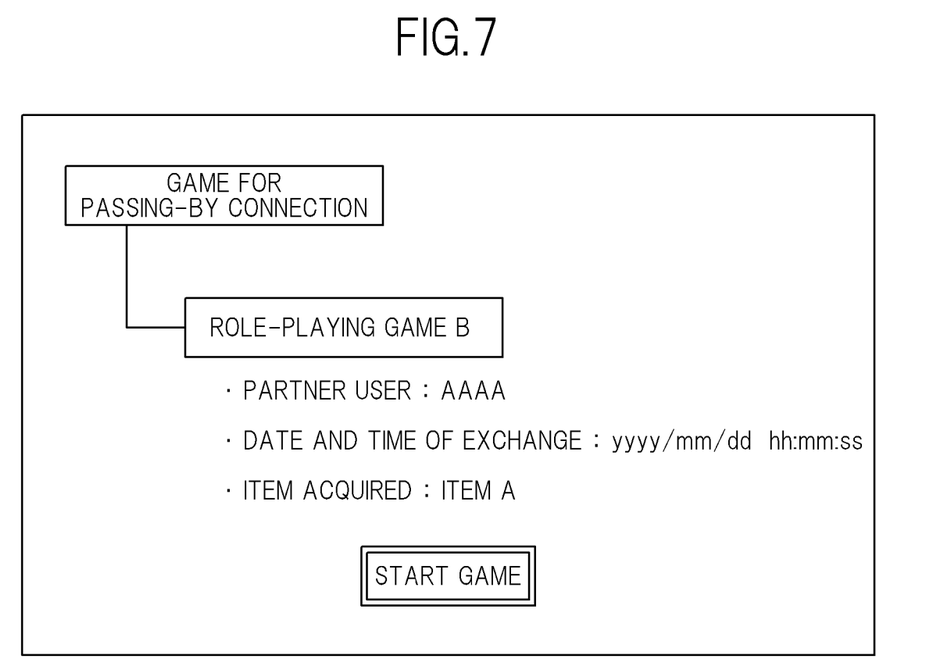
FIG. 7 A diagram illustrating an example of a result display screen of the data exchange processing.

In addition, in the list display screen described above, the user may be allowed to select the application program for which the data exchange processing has been executed by performing operation input from the operation unit 15. In response to such an instruction operation performed by the user, the exchange data-related information management section 22 causes the display unit 16 to display detailed information on a processing result of the data exchange processing executed for the selected application program. The detailed information to be displayed in this case may contain, for example, a user name of the user using another wireless communication terminal 1 being the target of the data exchange processing, date and time of execution of the data exchange processing, and a content of data acquired through the data exchange processing (for example, item name or character name). FIG. 7 illustrates an example of a result display screen for the data exchange processing described above. For example, the result display screen may include a list of games where information was successfully exchanged. In the example of the figure, in addition to the name of the selected application program and the detailed information of the data exchange processing, there is displayed a start button for the application program on the screen. When the user has performed the instruction operation to select the start button, the application executing section 21 may execute the selected application program. With this, the user can select the application program of his/her interest while referring to the result of the execution of the passing-by connection, and can directly start the execution of the application program with a simple operation.

Here, description is given of specific examples of the method of determining, by the above-mentioned exchange data determining section 23, the order in which communication connection is performed (connection order) with respect to a plurality of wireless communication terminals 1 which are to become partners of the data exchange, and the method of determining, by the above-mentioned exchange data determining section 23, the order in which the data exchange is performed (data exchange order) for a plurality of exchange data-related information items to be subjected to the data exchange with the partner wireless communication terminal 1. In the passing-by connection, there is a case where, before the exchange of all exchangeable exchange target data items is finished with all wireless communication terminals 1, a distance from a partner wireless communication terminal 1 becomes so large that the wireless communication cannot be continued. Accordingly, it is desired to prioritize the execution of data exchange which is to be performed with a partner wireless communication terminal 1 expected to have greater importance for the user and also prioritize the execution of data exchange which is expected to have greater importance for the user. In view of the above, the exchange data determining section 23 determines the order for the respective cases through, for example, the following methods.

Specifically, the exchange data determining section 23 acquires attribute information on each of a plurality of wireless communication terminals 1 which are communicably connectable by wireless, and then calculates the priority of each of the wireless communication terminals 1 by using the attribute information. Then, the wireless communication connection is performed in order with the wireless communication terminal 1 of higher priority as the partner of the data exchange. Examples of the attribute information on the wireless communication terminal 1 used on this occasion include: information on a past history of communication to the partner wireless communication terminal 1; information on a condition for communicating to the partner wireless communication terminal 1; the exchange data-related information items stored in the partner wireless communication terminal 1; and information on the user carrying the partner wireless communication terminal 1.

Specifically, in the case of using the information on the past history of communication to the partner wireless communication terminal 1, the exchange data determining section 23 determines the connection order so as to prioritize, for example, a partner to which the communication has been performed recently or a partner to which the communication has not been performed recently. In the former case, it is possible to perform the data exchange more frequently with a particular communication partner. Conversely, in the latter case, it is possible to perform the data exchange with a large number of communication partners.

Further, examples of the information on the condition for communicating to the partner wireless communication terminal 1 include information on communication quality, information on detection order, and information on the operation state of the partner wireless communication terminal 1. The exchange data determining section 23 determines the connection order so as to prioritize a wireless communication terminal 1 connectable with higher communication quality, a wireless communication terminal 1 detected successfully earlier in the detection processing of S1 of FIG. 5, and a wireless communication terminal 1 which is executing some processing rather than a wireless communication terminal 1 in the suspended state, respectively.

Further, the exchange data determining section 23 may acquire, as the attribute information, the list of the exchange data-related information items stored in the partner wireless communication terminal 1. In this case, for example, the exchange data determining section 23 compares the acquired lists with its own list of the exchange data-related information items stored in the storage unit 12, and then determines the connection order so as to prioritize a wireless communication terminal 1 having more exchange target data items to be subjected to the data exchange. Alternatively, the exchange data determining section 23 may prioritize a wireless communication terminal 1 having more types of application programs (for example, game genres) corresponding to respective exchange data-related information items in common with types corresponding to its own exchange data-related information items. Further, the exchange data determining section 23 may prioritize a wireless communication terminal 1 storing the exchange data-related information item which has not yet been subjected in the past to the data exchange by the wireless communication terminal 1$a$.

Further, examples of the information on the user carrying the partner wireless communication terminal 1 include information on the user's age or sex. In this case, the exchange data determining section 23 determines the connection order so as to prioritize a wireless communication terminal 1 carried by a user whose age is closer to that of the user carrying the wireless communication terminal 1$a$, or a wireless communication terminal 1 carried by a user whose sex is the same as or different from that of the user carrying the wireless communication terminal 1$a$.

Note that, the wireless communication terminal 1$a$ may receive, from another wireless communication terminal 1, the above-mentioned attribute information including the information on the operation state of the partner wireless communication terminal 1, the list of the exchange data-related information items, and the information on the user, along with the MAC address at the time of executing the above-mentioned processing of S3.

Further, the various kinds of conditions described above may be used in combination of a plurality of kinds thereof for determining the connection order. For example, the exchange data determining section 23 calculates the priority of each wireless communication terminal 1 by adding values each calculated by multiplying a value corresponding to each attribute information item by a weighting factor determined in advance or set by the user. Then, the connection is performed in order of priority of the wireless communication terminals 1.

Next, description is given of a specific example of the method of determining the order in which the data exchange is performed for a plurality of exchange data-related information items when the data exchange is performed with a particular wireless communication terminal 1. Similarly, in this case, the exchange data determining section 23 may calculate the priority of each exchange data-related information item based on the attribute information associated with the exchange data-related information item, to thereby execute the data exchange in accordance with the order indicated by the calculated priority. Examples of the attribute information for the exchange data-related information item include information on an execution history of the corresponding application program, information on the data exchange processing executed in the past, and information on an update history of the exchange data-related information item.

Specifically, in the case of using the information on the execution history of the corresponding application program, the exchange data determining section 23 determines the data exchange order so as to prioritize, for example, an exchange data-related information item corresponding to the application program which is being executed when the data exchange processing is executed or an exchange data-related information item corresponding to the application program executed immediately before. Further, the exchange data determining section 23 may determine the data exchange order so as to prioritize an exchange data-related information item corresponding to the application program which has been executed more frequently in a predetermined immediate past period. With this, for example, it is possible to preferentially set, as the exchange target, such data on a game or the like that the user has recently played most frequently.

Further, in the case of using the information on the past data exchange processing, the exchange data determining section 23 determines the data exchange order so as to prioritize, for example, an exchange data-related information item which required a shorter period of time in the previous data exchange processing. In addition, the exchange data determining section 23 may further use the information on the update history of the exchange data-related information item, to thereby determine the data exchange order so as to prioritize an exchange data-related information item which has been newly added after the previous data exchange processing or an exchange data-related information item which has been updated after the data exchange was executed last time with the same wireless communication terminal 1.

Note that, in the case of determining the data exchange order based on the information described above, the wireless communication terminal 1a records, as logs, the execution history of the application program, the execution history of the data exchange processing, the update history of the exchange data-related information items, etc.

Further, the exchange data determining section 23 may determine the data exchange order so as to prioritize an exchange data-related information item designated by the user as, for example, "favorite". Further, similarly to the example of the connection order, the various kinds of conditions described above may be used in combination of a plurality of kinds thereof for determining the data exchange order.

According to the wireless communication terminal 1 of this embodiment described above, even in a state in which an application program is not being executed, data on each of a plurality of application programs can be exchanged with another wireless communication terminal 1. Owing to this, the user can freely execute various kinds of application programs without much concern for whether or not the wireless communication terminal 1 is operating in the data exchange mode. Further, even if an application program is not being executed, it is possible to execute the exchange of data on the application program, which therefore serves to increase the opportunity to perform the data exchange with other wireless communication terminals 1.

Note that, the embodiment of the present invention is not limited to the description above. For example, in the description above, the wireless communication unit 13 executes wireless communication in accordance with the IEEE 802.11 standard, but the present invention is not limited thereto. For example, wireless communication may be executed in accordance with the Bluetooth (registered trademark) standard. Further, the data which the wireless communication terminal 1 according to this embodiment exchanges with another wireless communication terminal is not limited to data on a game, and may be data output by various kinds of application programs.

The invention claimed is:
1. A wireless communication client terminal, which can wirelessly communicate with a plurality of wireless communication client terminals, the wireless communication client terminal comprising:
an application executing section operating to execute a plurality of application programs and output one or more information items relating to each of the plurality of application programs;
a storage unit for storing the one or more information items related to the plurality of application programs of the wireless communication client terminal;
a data exchanger, separate from the application executing section, for executing a data exchange of the one or more of the information items with a first wireless communication client terminal among the plurality of wireless communication client terminals, where the data exchanger operates to carry out the data exchange simultaneously with the application executing section executing any one of the plurality of application programs;
a display unit configured to display game exchange information concerning the data exchange of one or more of the information items between the wireless communication client terminal and the first wireless communication client terminal; and
a control unit for controlling said display unit, said storage unit and said data exchanger, and for determining when a wireless connection with the first wireless communication client terminal has occurred,
wherein the control unit is configured to control the display unit to display:
(i) as at least part of the game exchange information, a list of games for which information items were successfully exchanged;

(ii) at least one game title, when having successfully exchanged information, shown with a light, word, character, or icon next to the at least one game title;

(iii) a game title, when having un-successfully exchanged information, shown darkened; and (iv) the control unit is configured to detect a user selection of one of the games on said list and control the display unit to display details of the selected one of the games that was successfully exchanged, including at least one of with whom the exchange was made, and a date and time of the exchange.

2. The wireless communication client terminal according to claim 1, wherein:

in a case where a plurality of the information items are determined to be subjected to data exchange, the data exchanger determines an execution order of the information items which is based on attribute information associated with each of the plurality of the information items; and the data exchanger executes the data exchange in accordance with the determined execution order.

3. The wireless communication client terminal according to claim 2, wherein the attribute information contains information on an execution history of the application programs corresponding to the information items.

4. The wireless communication client terminal according to claim 2, wherein the attribute information contains information on past data exchanges for the information items.

5. The wireless communication client terminal according to claim 2, wherein the attribute information contains information on an update history of the information items.

6. The wireless communication client terminal according to claim 1, wherein in a case where there are a plurality of other wireless communication client terminals for which a wireless communication connection can be established, the data exchanger determines an order in which the data is exchanged for each of the plurality of wireless communication client terminals, and establishes the wireless communication connection to each of the plurality of wireless communication client terminals in the determined order.

7. The wireless communication client terminal according to claim 1, wherein:

the one or more information items contain control information defining a communication procedure used when data is exchanged with the other wireless communication client terminal; and the data exchanger executes the data exchange which is based on the information item.

8. The wireless communication client terminal according to claim 1, wherein a game title on said list is displayed in a way so as to alert a user that game information was successfully exchanged.

9. The wireless communication client terminal according to claim 8, wherein said game title with successfully exchanged information is highlighted.

10. The wireless communication client terminal according to claim 1, wherein the game exchange information includes a list of one or more games for which information items have not been successfully exchanged.

11. A method of controlling a wireless communication client terminal, which can wirelessly communicate with a plurality of wireless communication client terminals, the method comprising:

executing a plurality of application programs, via an application executing section, and outputting one or more information items relating to each of the plurality of application programs;

storing the one or more information items related to the plurality of application programs of the wireless communication client terminal in a memory;

executing a data exchange, via a data exchanger that is separate from the application executing section, with a first wireless communication client terminal among the plurality of wireless communication client terminals, where the data exchanger operates to carry out the data exchange simultaneously with the application executing section executing any one of the plurality of application programs;

displaying on a display unit, game exchange information concerning the data exchange of one or more of the information items between the wireless communication client terminal and the first wireless communication client terminal;

controlling, with a control unit, said display unit, said storage unit and said data exchange, and determining when a wireless connection with the first wireless communication client terminal has occurred, wherein the displaying on the display unit includes displaying:

(i) as at least part of the game exchange information, a list of games for which information items were successfully exchanged;

(ii) at least one game title, when having successfully exchanged information, shown with a light, word, character, or icon next to the at least one game title; and (iii) a game title, when having un-successfully exchanged information, shown darkened, and wherein the method further comprises detecting a user selection of one of the games on said list and displaying details of the selected one of the games that was successfully exchanged, including at least one of with whom the exchange was made, and a date and time of the exchange.

12. A non-transitory, computer-readable information storage medium having a program stored therein, the program for causing a wireless communication client terminal, which can wirelessly communicate with a plurality of wireless communication client terminals, to:

execute a plurality of application programs, via an application executing section, and output one or more information items relating to each of the plurality of application programs;

store the one or more information items related to the plurality of application programs of the wireless communication client terminal;

determine when a wireless connection with a first wireless communication client terminal among the plurality of wireless communication client terminals has occurred;

execute a data exchange, via a data exchanger that is separate from the application executing section, with the first wireless communication client terminal, where the data exchanger operates to carry out the data exchange simultaneously with the application executing section executing any one of the plurality of application programs; and display on a display unit, game exchange information concerning the data exchange of one or more of the information items between the wireless communication client terminal and the first wireless communication client terminal, wherein the displaying on the display unit includes displaying:

(i) as at least part of the game exchange information, a list of games for which information items were successfully exchanged;

(ii) at least one game title, when having successfully exchanged information, shown with a light, word, character, or icon next to the at least one game title; and (iii) a game title, when having un-successfully exchanged information, shown darkened, and wherein the method further comprises detecting a user selection of one of the games on said list and displaying details of the selected one of the games that was successfully exchanged, including at least one of with whom the exchange was made, and a date and time of the exchange.

13. A wireless communication client terminal, comprising:
   a communication unit configured to: (i) wirelessly communicate with one or more of a plurality of other wireless communication client terminals, and (ii) determine whether any of the plurality of other wireless communication client terminals are within a predetermined range of the wireless communication client terminal such that a local communication network may be established therebetween;
   an application executing section operating to execute a plurality of application programs and output one or more information items relating to each of the plurality of application programs;
   a storage unit configured to store the one or more information items related to the plurality of application programs of the wireless communication client terminal;
   a data exchange unit, separate from the application executing section, configured to execute a data exchange of the one or more of the information items with the one or more of the plurality of wireless communication client terminals, wherein the data exchange includes at least one of sending data to, and receiving a data from, one or more of the plurality of other wireless communication client terminals, where the data exchanger operates to carry out the data exchange simultaneously with the application executing section executing any one of the plurality of application programs;
   a control unit configured to automatically instruct the data exchange unit to execute a data exchange with only one or more of the plurality of other wireless communication client terminals that are determined to be within the predetermined range; and
   a display unit configured to display game exchange information concerning the data exchange of one or more of the information items between the wireless communication client terminal and any of the plurality of other wireless communication client terminals, wherein the control unit is configured to control the display unit to display:
   (i) as at least part of the game exchange information, a list of games for which information items were successfully exchanged;
   (ii) at least one game title, when having successfully exchanged information, shown with a light, word, character, or icon next to the at least one game title;

(iii) a game title, when having un-successfully exchanged information, shown darkened; and (iv) the control unit is configured to detect a user selection of one of the games on said list and control the display unit to display details of the selected one of the games that was successfully exchanged, including at least one of with whom the exchange was made, and a date and time of the exchange.

14. The wireless communication client terminal of claim 13, wherein the control unit is configured to: (i) determine whether any of the plurality of other wireless communication client terminals have stored thereon one or more of the application programs of the wireless communication client terminal; and (ii) automatically instruct the data exchange unit to execute a data exchange with only one or more of the other plurality of wireless communication client terminals that are determined to be within the predetermined range and that have stored thereon the one or more of the application programs.

15. The wireless communication client terminal of claim 13, wherein the control unit is configured to: (i) determine whether a user of the wireless communication client terminal has instructed to enable or disable the automatic data exchange with one or more of the other plurality of wireless communication client terminals; and (ii) automatically instruct the data exchange unit to execute a data exchange with one or more of the other plurality of wireless communication client terminals only when the user has instructed to enable the automatic data exchange.

16. The wireless communication client terminal of claim 15, wherein the control unit is configured to: (i) determine whether any of the other plurality of wireless communication client terminals that are within the predetermined range are enabled for, or disabled from, the automatic data exchange; and (ii) automatically instruct the data exchange unit to execute a data exchange only when the user has instructed to enable the automatic data exchange and only with one or more of the other plurality of wireless communication client terminals that have been determined to be enabled for the automatic data exchange.

17. The wireless communication client terminal of claim 13, wherein:
   the storage unit is configured to store a plurality of information items related to a plurality of application programs, among which the at least one application program is one; and
   the control unit is configured to automatically instruct the data exchange unit to execute a data exchange as to the plurality of application programs with only one or more of the plurality of other wireless communication client terminals that are determined to be within the predetermined range.

18. The wireless communication client terminal of claim 13, wherein the plurality of application programs are game application programs and the game exchange information includes a list of titles for the plurality game application programs for which information items were successfully exchanged.

* * * * *